United States Patent
Miermans

(10) Patent No.: US 6,807,075 B2
(45) Date of Patent: Oct. 19, 2004

(54) START-UP CIRCUIT FOR SWITCHED MODE POWER SUPPLY

(75) Inventor: Hubertus Cornelis Miermans, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/275,493

(22) PCT Filed: Mar. 5, 2002

(86) PCT No.: PCT/IB02/00703

§ 371 (c)(1),
(2), (4) Date: Nov. 5, 2002

(87) PCT Pub. No.: WO02/071587

PCT Pub. Date: Sep. 12, 2002

(65) Prior Publication Data

US 2003/0169606 A1 Sep. 11, 2003

(30) Foreign Application Priority Data

Mar. 6, 2001 (EP) .............................. 01200843
Dec. 3, 2001 (EP) .............................. 01204666

(51) Int. Cl.$^7$ .............................................. H02M 3/335

(52) U.S. Cl. .................... 363/49; 363/21.15; 323/901

(58) Field of Search .............................. 363/49, 21.07, 363/21.15; 323/901

(56) References Cited

U.S. PATENT DOCUMENTS

| 581,453 A | 4/1897 | Boldt |
| 4,156,273 A | 5/1979 | Sato .............................. 363/56 |
| 5,014,178 A | 5/1991 | Balakrishnan ................ 363/49 |
| 5,675,485 A * | 10/1997 | Seong ........................... 363/97 |
| 5,812,385 A | 9/1998 | Leu ............................... 363/49 |
| 5,864,472 A * | 1/1999 | Peterson ....................... 363/18 |
| 6,104,173 A | 8/2000 | Kojima ........................ 323/222 |
| 6,125,046 A | 9/2000 | Jang et al. .................... 363/49 |
| 6,429,709 B1 * | 8/2002 | Hall et al. .................... 327/175 |

FOREIGN PATENT DOCUMENTS

EP 0425039 A2 2/1991 .......... H02M/3/155

* cited by examiner

Primary Examiner—Shawn Riley
(74) Attorney, Agent, or Firm—Edward W. Goodman

(57) ABSTRACT

A switched mode power supply apparatus is equipped with a start-up device supplying electrical energy to a controller which controls the switching of a switching transistor. The start-up device is bypassed by a bypass device. During start-up of the power supply, the bypass device is open. After a successful start-up, the bypass device is closed, eliminating further dissipation in the start-up device, and, therefore, increasing the overall energy efficiency of the power supply. By connecting the start-up device to a stand-by power supply or to a primary voltage, use of an additional winding on the transformer to supply the controller is obviated. The power supply has an electronic overload protection, and will stop and periodically attempt a restart when an overload condition occurs.

7 Claims, 2 Drawing Sheets

START-UP CIRCUIT FOR SWITCHED MODE POWER SUPPLY

BACKGROUND OF THE INVENTION

1. Field of the Invention

The invention relates to a switched mode power supply comprising a start-up device for supplying electrical energy to the controller in a start-up phase. Further, the invention relates to a method for starting up such a switched mode power supply, a controller start-up device for use in such a switched mode power supply, and a display apparatus comprising such a switched mode power supply.

Switched mode power supplies are used in a wide range of electronic equipment. Examples of such electronic equipment include computing equipment, television and video equipment, as well as portable telecommunication devices. Switched mode power supplies convert a DC primary voltage, such as a battery voltage or a rectified AC line voltage, into one or more secondary voltages.

2. Description of the Related Art

U.S. Pat. No. 5,581,453 discloses a start-up circuit for a switched mode power supply. The power supply comprises a transformer which is switched by a switching transistor to be periodically connected to an input voltage. Periodic pulses for driving the switching transistor are provided by a power supply control circuit. To be able to start such a power supply, the power supply is equipped with a start-up circuit comprising a start-up resistor and a capacitor. The start-up circuit provides the power supply control circuit with initial electrical energy. In addition thereto, the power supply control circuit is supplied with energy from an additional winding on the transformer, the voltage on this winding being rectified and supplied to the power supply control circuit. During start-up of the power supply, the supply of the power supply control circuit is fully accounted for by the start-up circuit. The start-up resistor will charge the capacitor, causing the supply voltage of the power supply control circuit to rise. Initially, the voltage on the transformer is low and, consequently, the additional winding of the transformer does not contribute to the supply of the power supply control circuit. After a certain start-up time, the output voltage of the power supply starts to rise. Consequently, the voltage available on the additional winding of the transformer starts to rise. When the voltage on the additional winding is sufficiently large, the winding will take over the supply of the power supply control circuit from the start-up circuit.

Typically, the start-up resistor is dimensioned to provide only a current which is sufficient to start up the power supply control circuit. The normal operating current of the power supply control circuit is much higher. Although not disclosed in the above publication, this causes the arrangement to have a built-in overload protection. In case the output voltage of the power supply lowers, for example, because of an overload or a short circuit, the voltage supplied by the transformer will decrease and consequently, the voltage on the additional winding will decrease. This causes the supply voltage of the power supply control circuit to drop as the start-up resistor has been dimensioned such as to only provide a small start-up current, which is insufficient to power the power supply control circuit during normal operation. As a result, the switching will stop and the power supply will enter a start-up sequence, attempting a new start up.

A disadvantage of this power supply is that an additional winding in the transformer is needed. This complicates the design of the transformer. On the one hand, this winding needs to be magnetically well coupled to the secondary side of the transformer, thus it needs to be wound physically close to the secondary winding. On the other hand, the additional winding is connected to the primary side of the transformer. Consequently, the additional winding needs to be thoroughly insulated, to avoid safety problems with the insulation between the primary side and secondary side of the transformer. In general, a triple insulated wire is used. This makes the transformer relatively expensive, complex and difficult to manufacture.

Another disadvantage is that the start-up time is long. To reduce dissipation in the start-up resistor, the value of the start-up resistor is chosen to be as high as possible, however, at the cost of a slow start-up, because the high value of the resistor results in only a small start-up current available for charging the capacitor coupled therewith.

Related to the above disadvantage is another disadvantage, being that the start-up resistor will continue to dissipate electrical energy during the operation of the power supply. As power efficiency is a premium requirement in power supplies, this continuous power dissipation is undesirable. To make the power supply suitable for a wide input supply voltage range, the value of the start-up resistor has to be chosen low, so as to guarantee sufficient start-up current for the power supply control circuit during start-up at a minimum input supply voltage. However, this low value will cause a too large current through the resistor at high input voltages, and thus causes a large dissipation in the resistor. As explained above, also the requirements for a quick start-up of the power supply will tend to decrease the value of the start-up resistor, thus also increasing power losses.

In an attempt to overcome the disadvantage related to the power dissipation, U.S. Pat. No. 5,581,453 discloses a switching transistor, connected with its collector-emitter main current path in series with the start-up resistor. During start-up of the power supply, the switching transistor is in a conducting state, causing the resistor to supply a start-up current. During normal operation of the power supply, the switching transistor is in a non-conducting state, stopping the dissipation in the start-up resistor. A disadvantage of this set-up is that it easily leads to degradation of the switching transistor, as the switching transistor stops conducting by a reverse bias on the base-emitter junction. As is known, in regular transistor designs, only a few volts base-emitter reverse bias will irreversibly degrade the transistor by causing base-emitter breakdown. This condition can easily occur, for example, by a dip in the input voltage or by a raise of the voltage supplied by the additional winding, e.g., caused by load variances or manufacturing tolerances in producing the transformer. Also, it should be clear that this set-up, although attempting to solve the power dissipation problem, will not solve the above-mentioned problem associated with the third winding in the transformer.

SUMMARY OF THE INVENTION

An object of the invention is to remove, or at least reduce, the problems associated with the prior art. Another object of the invention is to simplify the design of a switched mode power supply.

A first aspect of the invention provides a switched mode power supply for conversion of an input voltage into at least one output voltage, comprising an inductive device for transforming the input voltage into the at least one output voltage; a switching device for periodically coupling the inductive device to the input voltage; a controller for controlling the switching of the switching device, and a start-up device for supplying electrical energy to the controller in a start-up phase, characterized in that the switched mode power supply further comprises a bypass-device coupled in parallel to the start-up device for bypassing the start-up device when the switched mode power supply is in regulation.

A second aspect of the invention provides a method of starting up a switched mode power supply comprising the steps controlling a start-up device to supply electrical energy to a switching controller of the switched mode power supply; and bypassing the start-up device when the switched mode power supply is in regulation.

A third aspect of the invention provides a controller start-up device for use in a switched mode power supply apparatus, the controller start-up device comprising an input port and an output port; and a start-up device coupling the input port to the output port, characterized in that the controller start-up device comprises a bypass-switch connecting the input port to the output port, if the power supply is in regulation.

A fourth aspect of the invention provides a display apparatus comprising a switched mode power supply as described above in the first aspect of the invention.

By bypassing the start-up device by a bypass-device, two operating conditions can be discerned. When the bypass-device is open, the controller is supplied with a start-up current by the start-up device, enabling a start of the switching of the switching device. When the bypass-switch is closed, the limitation in the supply current caused by the start-up device is eliminated, causing the controller to have full driving power available to normally control the switching device, resulting in normal operation of the power supply. Also, when the bypass-switch is closed, a dissipation in the start-up device is eliminated, which increases the overall energy-efficiency of the power supply. As the dissipation in the start-up device during normal operation is eliminated, the start-up device can be dimensioned for optimum start-up time, thus resulting in a reduced start-up time.

In an embodiment of the invention, the bypass device is closed to bypass the start-up device when it is detected that the switched mode power supply is in a normal operation wherein the secondary voltage is stabilized. By detecting, with a detection device, an output quantity of the power supply apparatus indicating that the power supply is in regulation, such as comparing the value of a secondary voltage with a voltage reference, it is possible to operate the bypass device depending on an output quantity of the power supply apparatus, such as the value of the secondary voltage, or a current in the secondary winding, or an output power.

In another embodiment of the invention, the bypass device is closed to bypass the start-up device when it is detected that the secondary voltage exceeds a reference voltage. The switched mode power supply has a line voltage connected part comprising the primary winding, the switching device, the controller and the opto-coupler transistor which is connected to the line input voltage. The switched mode power supply has a line voltage isolated part comprising the secondary winding and the opto-coupler diode. The detected crossing of the reference voltage by the secondary voltage is transferred, via the opto-coupler diode and transistor, from the line voltage isolated part to the line voltage connected part. An opto-coupler is able to achieve excellent galvanic isolation by simple means.

Consequently, when the secondary voltage is low, such as during start-up of the power supply, the bypass device is open, and thus the controller is supplied with a start-up current only. If this start-up current is able to successfully start-up the power supply, then the secondary voltage will rise, and the detection device detects that the output quantity indicates that the power supply is in normal operation. For example, if the secondary voltage exceeds the limit set by the detection device, then the detection device causes the bypass device to close via the control circuit, so as to maintain sufficient operating current for the controller to be able to continue normal operation.

The output quantity of the power supply apparatus may represent one or more secondary voltages, one or more output currents of the power supply apparatus, any combination of any secondary voltage and output current(s), or any other value providing suitable means for determining the operation condition of, or which determines the control of the power supply apparatus, such as a voltage generated in an auxiliary winding of the inductive device.

In another embodiment of the invention, the main current path of the opto-coupler transistor is also coupled to the controller for controlling the switching of the switching device. In this way, the opto-coupler transistor also provides input to the control device for controlling the switching of the switching device. In this manner, efficient use of components can be achieved, causing a reduction in total component cost. Also, the start-up behavior can be improved by this combined use of components, as the tolerances in these components have similar effects on the behavior of the bypass device as well as on the behavior of the switching of the controller.

In the case of an overload, the detection device will detect that the secondary voltage is low, and, consequently, the detection device will cause the bypass device to open, via the opto-coupler. This will automatically bring the power supply into start-up mode again and the power supply will attempt to restart, thus providing an electronic protection against overload.

The bypass device advantageously comprises a transistor, allowing for a simple and cost effective switching.

As the start-up device can be advantageously coupled to a primary voltage, or to a stand-by voltage supply, whichever is of a suitable value, this makes the use of an additional winding on the inductive device unnecessary, thus simplifying the design and manufacturing of the inductive device. Also, this avoids safety problems occurring particularly in the insulation of a transformer. An additional winding, with its associated isolation requirements, is not required. By avoiding the additional winding on the transformer and coupling the start-up device to a well defined voltage supply, such as a stand-by voltage supply, the start-up of the power supply as well as the restart in case of an overload are improved. The start-up does not depend any more on the magnetic coupling of an additional winding inside the transformer, and it does not depend any more on a primary voltage, which, in most cases, has a large input voltage range. This makes the start-up behavior of the power supply easier to control and predict, and the adverse influence of the tolerances of the transformer and the input voltage range can be eliminated.

Advantageously, the start-up device comprises a start-up resistor, connected between an input terminal and an output terminal of the start-up device, for providing a start-up current to the controller, and a capacitor, connected between the output terminal of the start-up device and ground. The value of the resistor can be chosen such that the resistor will supply an adequate start-up current to the controller, the value of the capacitor can be chosen such as to enable sufficient time delay to assure a sufficiently long start-up time. The combination of the resistor and capacitor is be chosen such as to assure a certain time between successive attempts to start-up the power supply in case of an overload, and to assure a reliable start-up of the power supply.

As explained above, because of the presence of the bypass device, dimensioning of the resistor for minimum power dissipation in not required, enlarging the degree of freedom when dimensioning the start-up device. This allows for choosing a low value of the resistance of the resistor such that a short start-up time is guaranteed, while avoiding a continuous high dissipation associated with such a low resistance value, because the resistor is bypassed once the start-up has taken place.

As the inductive device can comprise a transformer or an inductor, the subject invention can be used with various types of switched mode power supplies, such as a so-called fly-back, a step-up, a feed-forward or a resonant converter which are or are not line voltage isolated.

BRIEF DESCRIPTION OF THE DRAWINGS

Further features and advantages will become clear from the appended drawings, illustrating non-limiting embodiments of the invention, in which.

In the different Figures, the same reference numerals indicate the same or similar components.

DESCRIPTION OF THE PREFERRED EMBODIMENTS

Figure 1:
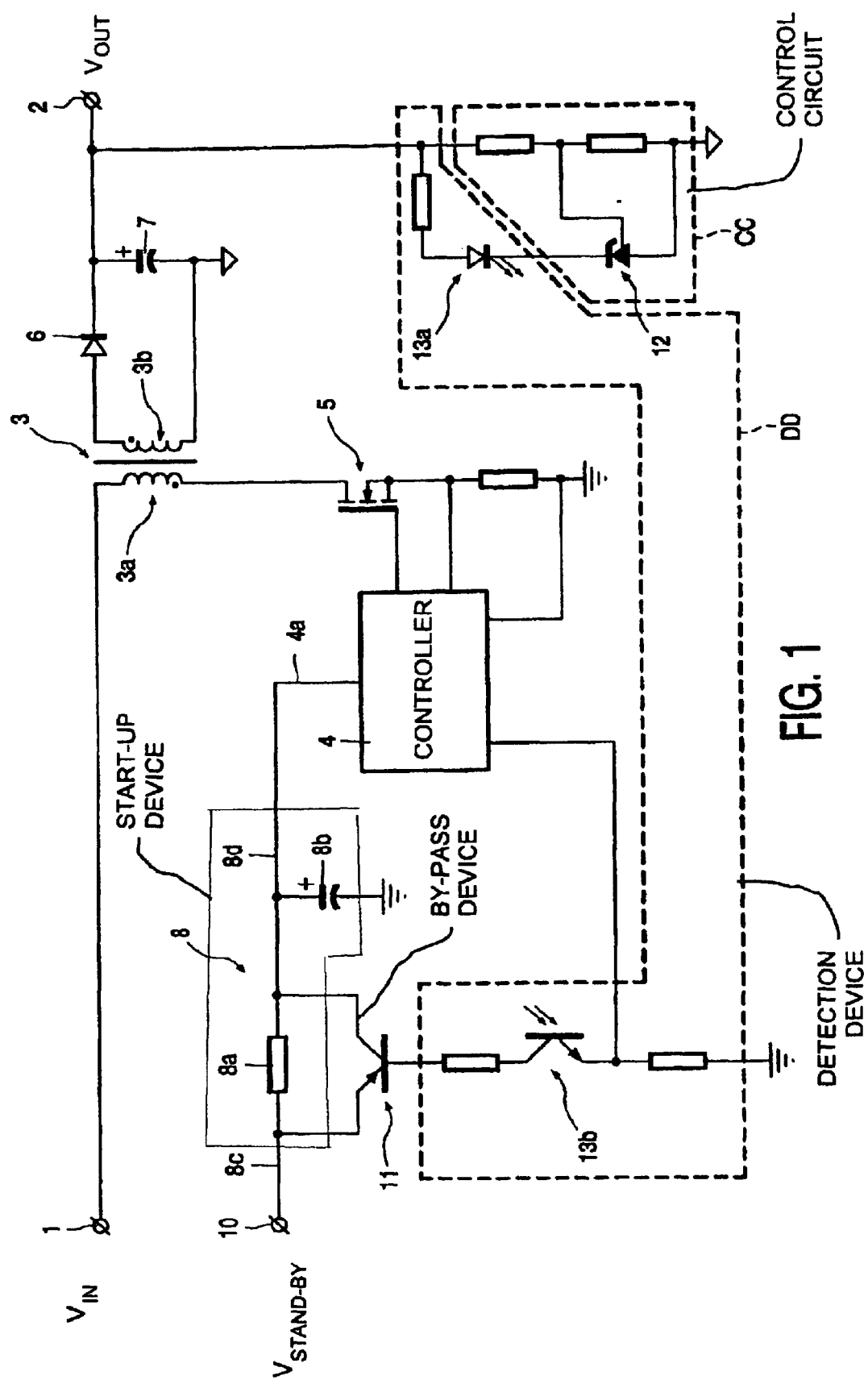
FIG. 1 shows a schematic electrical circuit diagram of an embodiment of a switched mode power supply according to the invention.

In FIG. 1, the switched mode power supply converts an input voltage applied at a terminal 1 in to an output voltage at a terminal 2. The terminals 1, 2 are coupled to a transformer 3, having a primary winding 3a and a secondary winding 3b. A controller 4, which may comprise an integrated circuit device, controls the switching of a switching device, in this case a switching transistor 5 of the Field Effect Transistor (FET) type. At the secondary winding 3b of the transformer, electrical pulses are rectified and filtered by a rectifying diode 6 and a capacitor 7. The controller 4 is supplied with electrical energy via a start-up device 8, which comprises a resistor Ba and a capacitor 8b. The start-up device 8 supplies a start-up current to the controller 4, for which purpose an output port 8d of the start-up device is connected to a power supply terminal 4a of the controller 4. An input port 8c of the start-up device 8 is connected to a stand-by voltage supply at a terminal 10. The start-up device 8 can be bypassed by a bypass device 11, in this-case, a switching transistor, connected with its main current path between the input port 8c and the output port 8d of the start-up device 8. The switching of the bypass device 11 is controlled by a control device CC, comprising a voltage reference 12 and two resistors, and a detection device DD, comprising an opto-coupler 13a, 13b, and three resistors. The opto-coupler 13a, 13b is also connected to the controller 4, for controlling the switching of the switching transistor 5 depending on the secondary voltage at the terminal 2. The opto-coupler comprises an opto-coupler diode 13a which is optically coupled to an opto-coupler transistor 13b.

When starting the power supply, the controller 4 is supplied with electrical energy via the start-up device 8 from the stand-by voltage supply through terminal 10. The controller 4 starts a periodic switching of the switching transistor 5 by supplying electrical drive pulses to the switching transistor 5. The switching of the switching transistor 5 will cause pulses to appear at the secondary winding 3b of the transformer 3. The electrical energy required by the controller 4 to be able to drive the switching transistor 5 is larger than the electrical energy supplied to the controller 4 by the start-up device 8. Consequently, the voltage across the capacitor 8b, being the voltage on the power supply terminal 4a of the controller 4, will decrease, as electrical energy is drawn out of the capacitor 8b.

If, during start-up, the power supply is able to build up a secondary voltage which has a sufficiently high value, then the voltage reference 12 will start to conduct, causing the opto-coupler 13a, 13b to conduct. As a result, the bypass device, formed by the transistor 11 will start to conduct. This causes the bypass device 11 to bypass the start-up resistor 8a, and consequently, cause the voltage at the output port 8d of the start-up device 8 to increase, assuring the supply of sufficient electrical energy to the controller 4 to be able to normally operate the power supply.

If, however, during the start-up, the power supply is not able to build up a secondary voltage which has a sufficiently high value, the voltage reference 12 and the opto-coupler 13 will not start conducting. As a result, the voltage across the capacitor 8b will continue to decrease, because the electrical energy supplied by the start-up device 8a is lower than the electrical energy consumed by the controller 4. At a certain moment in time, the voltage across the capacitor 8b gets to such a low value, that the controller 4 stops operating and stops driving the switching transistor 5. Consequently, the power supply will stop.

The power supply according to FIG. 1 provides an overload protection. When the secondary voltage 2 is too low, which can be caused by overload, or a short circuit, the bypass-device 11 will not be closed and as a result, the controller 4 will stop operating the switching transistor 5.

Also, the power supply according to FIG. 1 provides an automatic restart. In the case that, as described above, an attempt to start-up the power supply is not successful, the capacitor 8b is recharged by the resistor 8a, causing the voltage at the supply voltage terminal 4a of the controller 4 to increase. At a certain moment, this voltage will be sufficiently high, causing the controller 4 to start again with the switching of the switching transistor 5, thus attempting again to start-up the power supply. As a result, in case the power supply is in a condition of overload, it will periodically attempt to start-up.

The start-up and restart behavior of the power supply according to the invention can be easily controlled, as it is largely dependent on the respective values of the resistor 8a and the capacitor 8b forming the start-up network.

Figure 2:
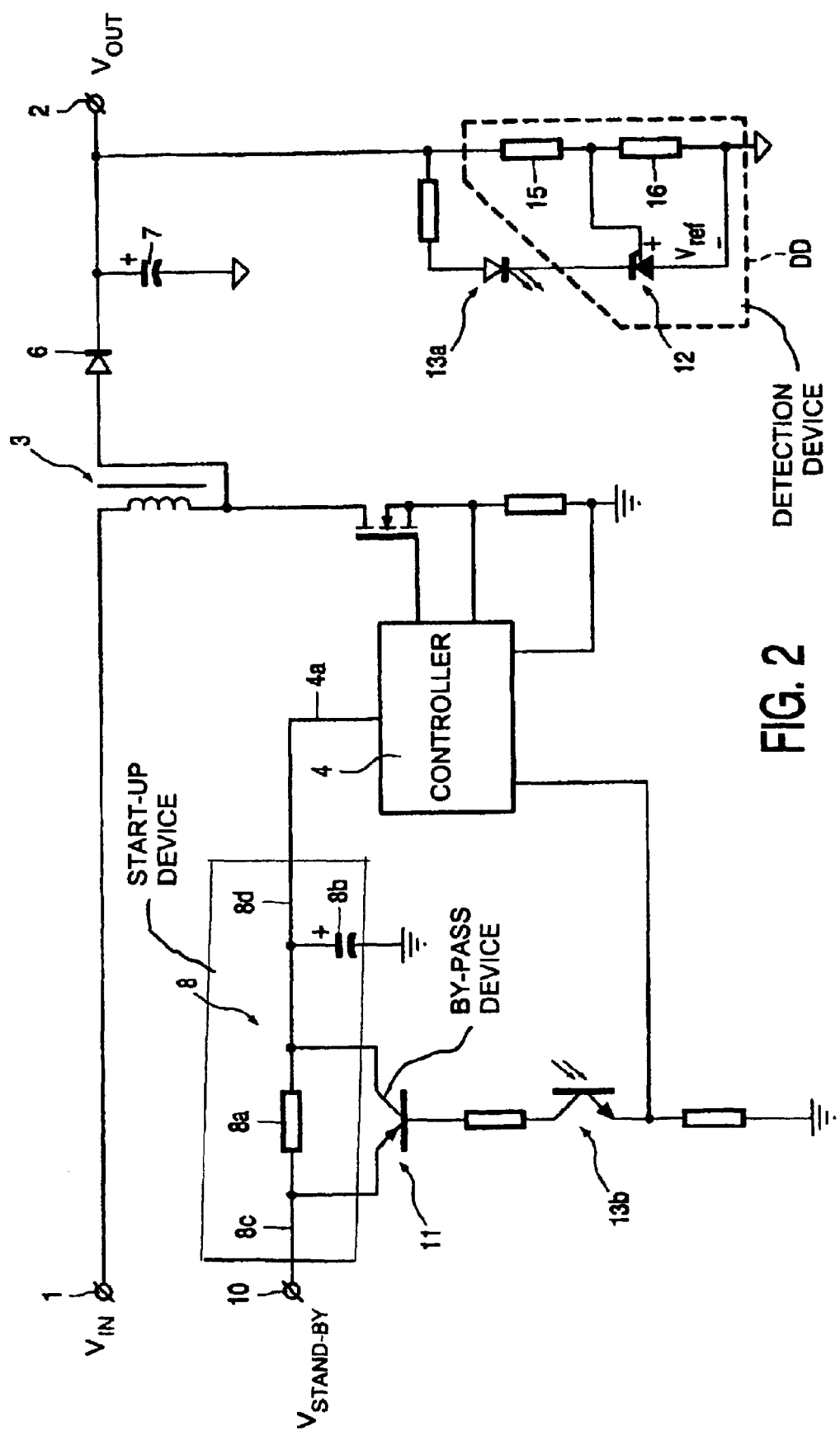
FIG. 2 shows a schematic electrical circuit diagram of another embodiment of a switched mode power supply according to the invention.

The invention can also be used with other types of switched mode power supplies. For example, FIG. 2 shows another switched mode power supply, which is a slightly simplified version of the switched mode power supply shown in FIG. 1, using a single inductor 3 instead of a transformer. As a result, this power supply does not show galvanic isolation between the input voltage 1 and the output voltage 2. Furthermore, all features and benefits of the power supply according to the invention, as described with FIG. 1, are equally well applicable. Furthermore, the resistor 8a can be replaced by a current source. The detection device DD now comprises a voltage divider including the resistors 15 and 16, and a comparator 12, having a built-in reference voltage Vref, for comparing the tapped-in output voltage and the reference voltage Vref. The comparator 12 causes a current through the opto-coupler diode 13a when the tapped-in output voltage exceeds the reference voltage. The supply voltage supplied to the opto-coupler diode may be any suitable DC voltage generated by the power supply.

Thus, the invention provides a switched mode power supply showing a quick start-up time as well as low power loss in the start-up device during normal operation, allowing for a simple design and manufacturing of the transformer, while, at the same time, offering a well-defined start-up behavior and a well defined restart behavior in case of an overload.

What is claimed is:

1. A switched mode power supply for conversion of an input voltage into at least one output voltage, comprising:
   an inductive device for transforming the input voltage into the at least one output voltage;
   a switching device for periodically coupling the inductive device to the input voltage;
   a controller for controlling the switching of the switching device;
   a start-up device for supplying electrical energy to the controller in a start-up phase; and
   a bypass device coupled in parallel to the start-up device for bypassing the start-up device when the switched mode power supply is in regulation,
   characterized in that the switched mode power supply further comprises:
   a detection device for detecting whether an output quantity of the switched mode power supply indicates that the switched mode power supply is in regulation; and
   a control circuit for controlling the bypass device to be closed when the detection device detects that the switched mode power supply is in regulation.

2. The switched mode power supply as claimed in claim 1, characterized in that the inductive device comprises a transformer having a primary winding and a secondary winding, the primary winding being coupled to the switching device, and the secondary winding being coupled to supply the at least one output voltage, and in that the control circuit comprises:
   an opto-coupler diode;
   comparator circuit for comparing the at least one output voltage with a reference voltage to provide a current to the opto-coupler diode when the at least one output voltage exceeds the reference voltage; and
   an opto-coupler transistor optically coupled to the opto-coupler diode and having a main current path coupled to a control input of the bypass device.

3. A switched mode power supply for conversion of an input voltage into at least one output voltage, comprising:
   an inductive device for transforming the input voltage into the at least one output voltage;
   a switching device for Periodically coupling the inductive device to the input voltage;
   a controller for controlling the switching of the switching device;
   a start-up device for supplying electrical energy to the controller in a start-up phase; and
   a bypass device coupled in parallel to the start-up device for bypassing the start-up device when the switched mode power supply is in regulation,
   characterized in that the bypass device is a controllable semiconductor switch.

4. The switched mode power supply as claimed in claim 2, characterized in that the main current path of the opto-coupler transistor is also coupled to the controller for controlling the switching of the switching device.

5. The switched mode power supply as claimed in claim 1, characterized in that the start-up device is coupled to a stand-by voltage supply or a primary voltage.

6. A switched mode power supply for conversion of an input voltage into at least one output voltage, comprising:
   an inductive device for transforming the input voltage into the at least one output voltage;
   a switching device for periodically coupling the inductive device to the input voltage;
   a controller for controlling the switching of the switching device;
   a start-up device for supplying electrical energy to the controller in a start-up phase;
   a bypass-device coupled in parallel to the start-up device for bypassing the start-up device when the switched mode power supply is in regulation;
   a detection device for detecting whether an output quantity of the switched mode power supply indicates that the switched mode power Supply is in regulation; and
   a control circuit for controlling the bypass device to be closed when the detection device detects that the switched mode power supply is in regulation,
   characterized in that the controller the bypass device the detection device detects that the at least one output voltage drops below a predetermined value.

7. A method of starting up a switched mode power supply for conversion of an input voltage into at least one output voltage, the switched mode power supply comprising:
   an inductive device for transforming the input voltage into the at least one output voltage;
   a switching device for periodically coupling the primary winding to the input voltage;
   a controller for controlling the switching of the switching device; and
   a start-up device for supplying electrical energy to the controller in a start-up phase, characterized in that the method further comprises the steps:
   supplying electrical energy to the controller from the start-up device in a start-up phase;
   detecting when the switched mode power supply is in regulation; and
   bypassing the start-up device, when the switched mode power supply is detected to be in regulation.

* * * * *